United States Patent
Pomerantz et al.

(10) Patent No.: US 10,101,484 B2
(45) Date of Patent: Oct. 16, 2018

(54) ASSESSING RISKS OF COMPARTMENTALIZATION

(71) Applicant: Schlumberger Technology Corporation, Sugar Land, TX (US)

(72) Inventors: Andrew Emil Pomerantz, Lexington, MA (US); Hadrien Dumont, Houston, TX (US); Joseph Carl Fiduk, Houston, TX (US); Vinay Mishra, Katy, TX (US); Youxiang Zuo, Burnaby (CA); Oliver C. Mullins, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 495 days.

(21) Appl. No.: 14/635,760

(22) Filed: Mar. 2, 2015

(65) Prior Publication Data
US 2015/0247942 A1      Sep. 3, 2015

Related U.S. Application Data

(60) Provisional application No. 61/947,258, filed on Mar. 3, 2014.

(51) Int. Cl.
*G01V 1/50* (2006.01)
*G01V 1/00* (2006.01)
(Continued)

(52) U.S. Cl.
CPC .............. *G01V 1/50* (2013.01); *E21B 49/00* (2013.01); *G01V 1/003* (2013.01); *G01V 11/00* (2013.01);
(Continued)

(58) Field of Classification Search
CPC ............. G01V 1/40; G01V 1/003; G01V 1/50
See application file for complete search history.

(56) References Cited

U.S. PATENT DOCUMENTS

| 5,150,331 A | 9/1992 | Harris et al. |
| 6,290,000 B1 | 9/2001 | Zamfes |

(Continued)

FOREIGN PATENT DOCUMENTS

| EP | 1733222 A1 | 6/2013 |
| EP | 3114314 A1 * | 1/2017 ............... G01V 1/40 |

(Continued)

OTHER PUBLICATIONS

Granli, et al., "Imaging through gas-filled sediments using marine shear-wave data," Geophysics 1999, 64, 668-677.
(Continued)

*Primary Examiner* — Douglas Menz
(74) *Attorney, Agent, or Firm* — Mithcell M. Blakely

(57) ABSTRACT

Various implementations described herein are directed to a method for assessing risks of compartmentalization. In one implementation, the method may include receiving seismic data for a formation of interest; identifying areas in the formation having a dip angle greater than about 30 degrees; performing a plurality of downhole fluid analysis (DFA) within a wellbore around the formation having the dip angle greater than about 30 degrees to identify areas experiencing mass density inversion; and determining the areas experiencing mass density inversion by DFA as having one or more risks of compartmentalization.

20 Claims, 7 Drawing Sheets

(51) Int. Cl.
*E21B 49/00* (2006.01)
*G01V 11/00* (2006.01)
(52) U.S. Cl.
CPC .. *G01V 2210/644* (2013.01); *G01V 2210/663* (2013.01)

(56) References Cited

U.S. PATENT DOCUMENTS

| | | | | |
|---|---|---|---|---|
| 9,243,493 | B2* | 1/2016 | Hsu | E21B 47/102 |
| 2005/0109098 | A1 | 5/2005 | Difoggio | |
| 2007/0169540 | A1 | 7/2007 | Sterner et al. | |
| 2008/0040086 | A1 | 2/2008 | Betancourt et al. | |
| 2009/0166085 | A1 | 7/2009 | Ciglenec et al. | |
| 2009/0288881 | A1* | 11/2009 | Mullins | E21B 7/04 175/50 |
| 2010/0228485 | A1* | 9/2010 | Betancourt | G01V 11/00 702/13 |
| 2011/0088895 | A1* | 4/2011 | Pop | E21B 7/04 166/254.2 |
| 2012/0147704 | A1* | 6/2012 | Xian | G01V 1/50 367/73 |
| 2012/0232859 | A1* | 9/2012 | Pomerantz | G01V 99/005 703/2 |
| 2013/0112406 | A1 | 5/2013 | Zuo et al. | |
| 2013/0151159 | A1* | 6/2013 | Pomerantz | E21B 49/082 702/11 |
| 2013/0302974 | A1* | 11/2013 | Hahn | H01L 21/823842 438/585 |
| 2015/0247942 | A1* | 9/2015 | Pomerantz | G01V 1/40 702/11 |

FOREIGN PATENT DOCUMENTS

| | | | | |
|---|---|---|---|---|
| EP | 3114506 A1 * | 1/2017 | | G01V 1/40 |
| WO | WO 2015134515 A1 * | 9/2015 | | G01V 1/40 |

OTHER PUBLICATIONS

Mullins, "The Modified Yen Model," Energy and Fuels 2010, vol. 24, 2179-2207.

Mullins, et al., "Advances in Asphaltene Science and the Yen—Mullins Model," Energy and Fuels 2012, vol. 26, pp. 3986-4003.
Mullins, et al., "Downhole Fluid Analysis and Asphaltene Nanoscience for Reservoir Evaluation Measurement," In SPWLA 53rd Annual Logging Symposium, Cartagena, Colombia, 2012.
Pomerantz, et al., "Combining biomarker and bulk compositional gradient analysis to assess reservoir connectivity," Organic Geochemistry 2010, vol. 41, pp. 812-821.
Robison, et al., "Salt Geometry and Subsalt Trapping in the Enchilada Area, NE Garden Banks, Offshore Louisiana," Gulf Coast Association of Geological Societies Transactions 1997, vol. 47, pp. 485-491.
Stainforth, "New insights into reservoir filling and mixing processes," In Understanding Petroleum Reservoirs: Towards an Integrated Reservoir Engineering and Geochemical Approach, Cubitt, J. M.; England, W. A.; Larter, S. R., Eds. Geological Society: London, 2004; vol. 237, pp. 115-132.
Zhu, et al., "Geochemistry, origin, and deep-water exploration potential of natural gases in the Pearl River Mouth and Qiongdongnan basins, South China Sea," AAPG Bulletin 2009, 93, 741-761.
Zuo, et al., "Advances in the Flory-Huggins-Zuo Equation of State for Asphaltene Gradients and Formation Evaluation," Energy and Fuels 2012, pp. 1722-1735.
Zuo, et al., "Asphaltene Grading and Tar Mats in Oil Reservoirs," Energy & Fuels 2012, 26, 1670-1680.
International Search Report and Written Opinion for the cross referenced International patent application PCT/US2015/018500 dated May 27, 2015.
International Search Report and Written Opinion for the equivalent International patent application PCT/US2015/018513 dated Jun. 17, 2015.
International Preliminary Report on Patentability for the cross referenced International patent application PCT/US2015/018500 dated Sep. 9, 2016.
International Preliminary Report on Patentability for the equivalent International patent application PCT/US2015/018513 dated Sep. 15, 2016.
Extended Search Report for the cross referenced European patent application 15759034.0 dated Sep. 19, 2017.

* cited by examiner

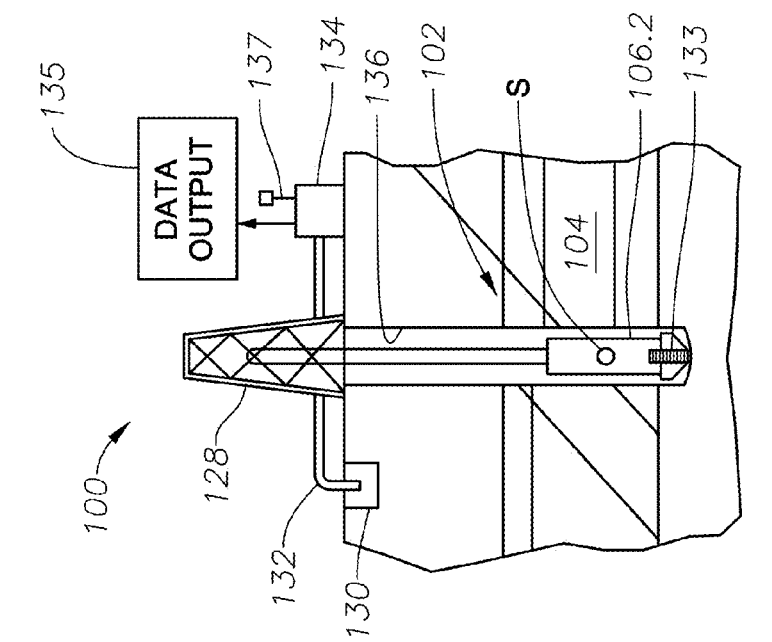
FIG. 1.2
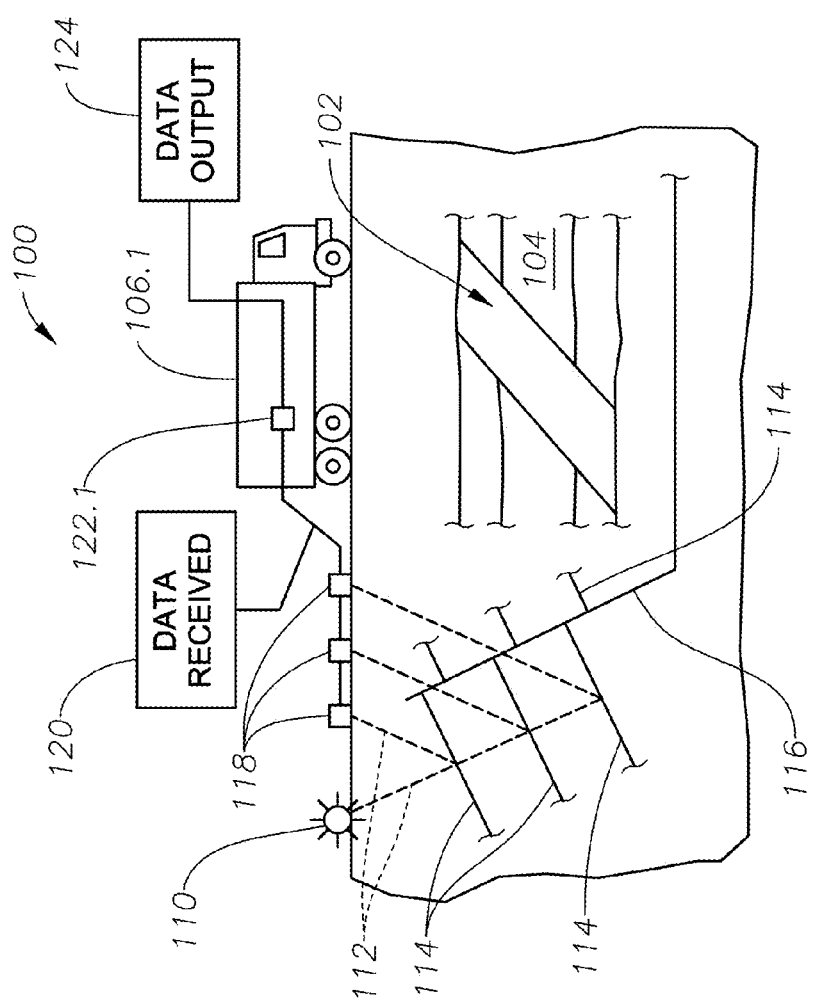
FIG. 1.1

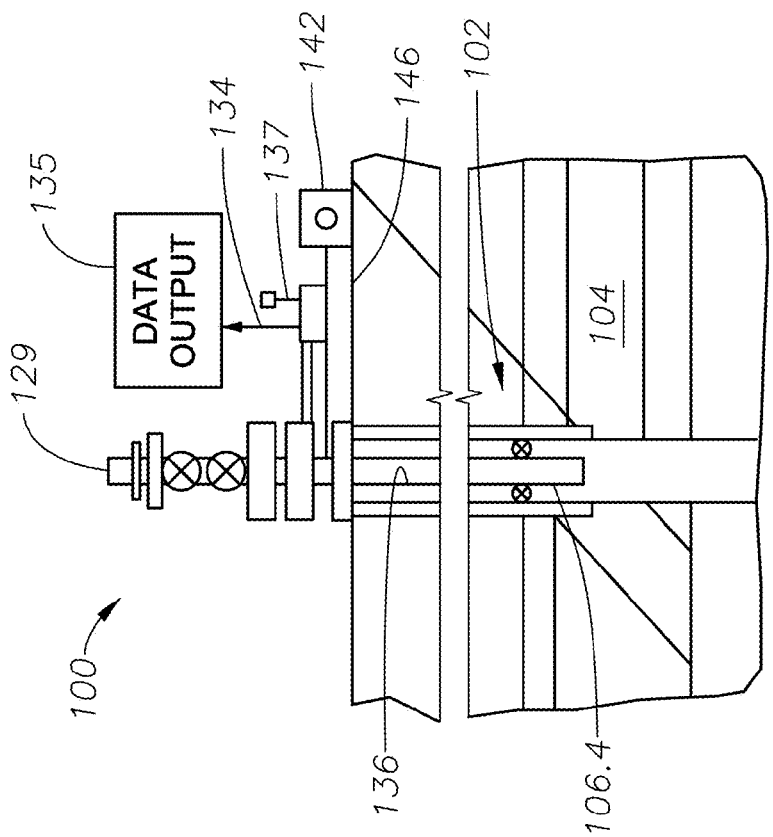
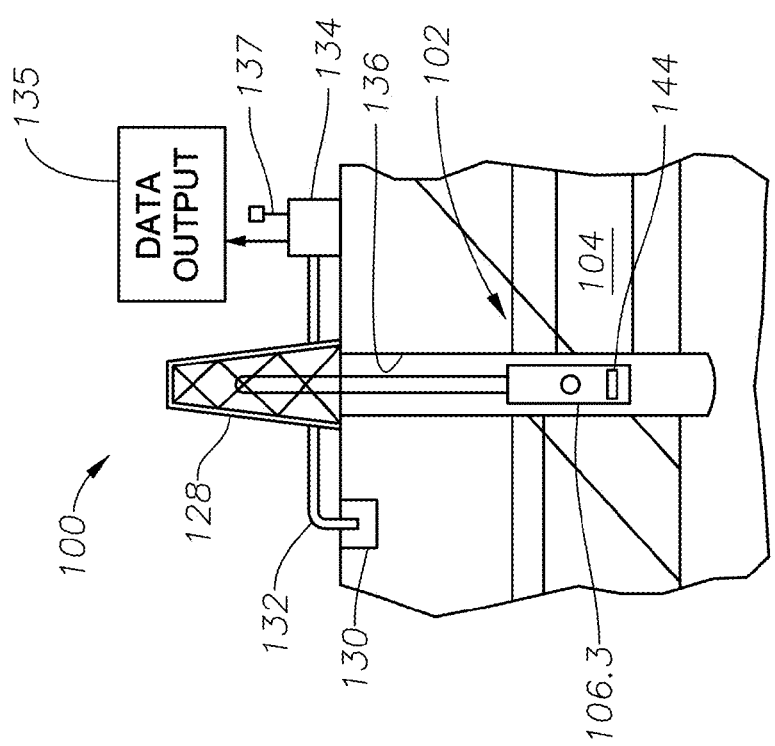
FIG. 1.4
FIG. 1.3

ASSESSING RISKS OF COMPARTMENTALIZATION

CROSS-REFERENCE TO RELATED APPLICATIONS

This application claims the benefit of U.S. Provisional Patent Application Ser. No. 61/947,258, filed Mar. 3, 2014, titled METHODS AND COMPUTING SYSTEMS FOR PROCESSING AND TRANSFORMING COLLECTED DATA FOR IMPROVED SUBSURFACE PROPERTY IDENTIFICATION, and the disclosure of which is incorporated herein by reference.

BACKGROUND

One of the primary goals of an oil and gas operating company is to develop a reservoir asset in the most cost-efficient way. As such, it would be desirable for the operating company to identify and assess the risks that may impair the drainage of this hydrocarbon accumulation before production starts and as field development progresses. For example, it would be desirable for the operating company to identify the level of spatial connectivity within reservoir units, i.e., to identify flow barriers (baffles) caused either by the migration of salt, geological deposition of sediments, or by deposition of solid particles, heavy hydrocarbons, precipitated from reservoir fluids.

The presence of impermeable flow barriers may present a geological risk to hydrocarbon exploration. Flow barriers may isolate regions of a reservoir as separate fluid compartments, which are not in flow communication with other locations in the reservoir. Since each isolated fluid compartment may involve penetration by a wellbore to be drained, the number of compartments can impact the cost to develop a field.

Before a drilling operation commences a seismic survey may be performed whereby reflected seismology is used to explore, and thereby determine the properties of Earth's subsurface for the purpose of identifying features associated with hydrocarbon deposits. The seismic survey may be performed on land or water.

During or after a drilling operation, evaluations may be performed on the reservoir for various purposes, such as to manage the production of hydrocarbons from the reservoir. In one scenario, formation evaluation may involve drawing fluid from the reservoir into a downhole tool for testing or sampling. Various devices, such as probes or packers, may be extended from the downhole tool to isolate a region of the wellbore wall, and thereby establish fluid communication with the reservoir surrounding the wellbore. Fluid may then be drawn into the downhole tool using the probe or packer. Within the downhole tool, the fluid may be directed to one or more fluid analyzers, and sensors that may detect properties of the fluid. The properties of the fluid may be used to determine reservoir architecture, connectivity, compartmentalization, compositional gradients or the like.

SUMMARY

Various implementations described herein are directed to a method for assessing risks of compartmentalization. In one implementation, the method may include receiving seismic data for a formation of interest; identifying areas in the formation having a dip angle greater than about 30 degrees; performing a plurality of downhole fluid analysis (DFA) within a wellbore around the formation having the dip angle greater than about 30 degrees to identify areas experiencing mass density inversion; and determining the areas experiencing mass density inversion by DFA as having one or more risks of compartmentalization.

Various implementations described herein are directed to a non-transitory computer readable medium having stored thereon a plurality of computer-executable instructions which, when executed by a computer, cause the computer to: receive seismic data for a formation of interest; identify areas in the formation having a dip angle greater than about 30 degrees; perform a plurality of downhole fluid analysis (DFA) within a wellbore around the formation having the dip angle greater than about 30 degrees to identify areas experiencing mass density inversion; and determine the areas experiencing mass density inversion by DFA as having one or more risks of compartmentalization.

Various implementations described herein are directed to a method for assessing risks of compartmentalization, comprising: receiving seismic data for a formation of interest; identifying areas in the formation having a dip angle greater than about 30 degrees; performing a plurality of downhole fluid analysis (DFA) within a wellbore around the formation having the dip angle greater than about 30 degrees to identify areas experiencing mass density inversion; determining the areas experiencing mass density inversion by DFA as likely having one or more sealing barriers; and modifying a DFA program to identify well and formation locations that have normal mass density distributions near the base of the oil column in the wellbore.

The above referenced summary section is provided to introduce a selection of concepts in a simplified form that are further described below in the detailed description section. The summary is not intended to be used to limit the scope of the claimed subject matter. Furthermore, the claimed subject matter is not limited to implementations that solve any disadvantages noted in any part of this disclosure. Indeed, the systems, methods, processing procedures, techniques, and workflows disclosed herein may complement or replace conventional methods for identifying, isolating, or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various techniques will hereafter be described with reference to the accompanying drawings. However, it should be understood, that the accompanying drawings illustrate the various implementations described herein, and are not meant to limit the scope of various techniques described herein.

FIG. 1.1 illustrates a simplified diagrammatical view of a seismic survey operation being performed by a seismic truck to measure properties of the subterranean formation in connection with various implementations described herein.

FIG. 1.2 illustrates a simplified diagrammatical view of a drilling operation being performed by drilling tools suspended by a rig, and advanced into the subterranean formations to form a wellbore in connection with various implementations described herein.

FIG. 1.3 illustrates a simplified diagrammatical view of a wireline operation being performed by a wireline tool suspended by a rig, and lowered into the wellbore in connection with various implementations described herein.

FIG. 1.4 illustrates a simplified diagrammatical view of a production operation being performed by a production tool deployed from a production unit, or Christmas tree into the wellbore to draw fluid from the downhole reservoirs into surface facilities in connection with various implementations described herein.

DETAILED DESCRIPTION

Figure 2:
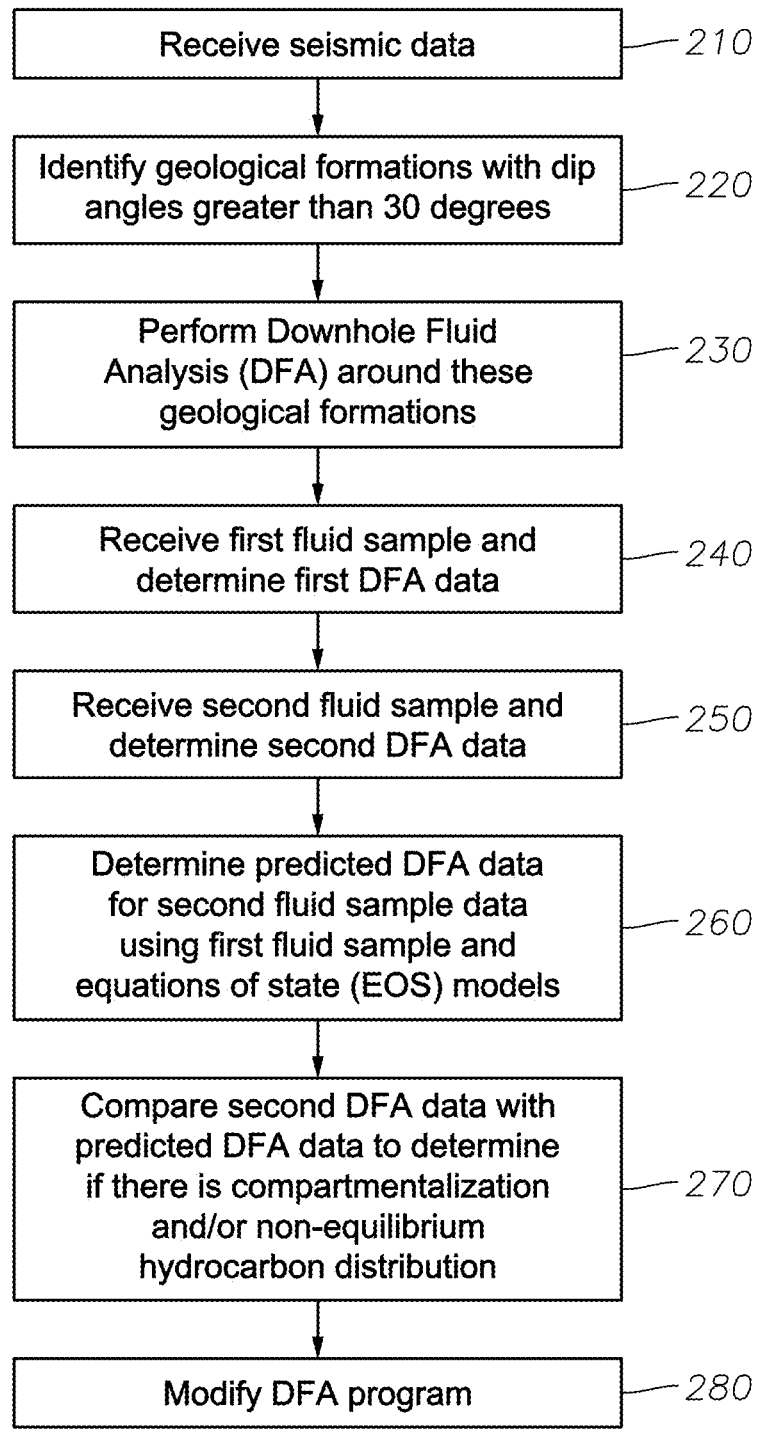
FIG. 2 illustrates a flow diagram of a method for the integration of seismic data and downhole fluid analysis (DFA) to identify flow barriers and compartmentalization in accordance with various implementations described herein.

The discussion below is directed to certain specific implementations. It is to be understood that the discussion below is for the purpose of enabling a person with ordinary skill in the art to make and use any subject matter defined now or later by the patent "claims" found in any issued patent herein.

It is specifically intended that the claims not be limited to the implementations and illustrations contained herein, but include modified forms of those implementations including portions of the implementations and combinations of elements of different implementations as come within the scope of the following claims.

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to obscure aspects of the embodiments.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the claims. The first object and the second object are both objects, respectively, but they are not to be considered the same object.

The terminology used in the description of the present disclosure herein is for the purpose of describing particular implementations and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses one or more possible combinations of one or more of the associated listed items. It will be further understood that the terms "includes" and/or "including," when used in this specification, specify the presence of stated features, integers, operations, elements, and/or components, but do not preclude the presence or addition of one or more other features, integers, operations, elements, components and/or groups thereof.

As used herein, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

It should also be noted that in the development of any such actual implementation, numerous decisions specific to circumstance may be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The terminology and phraseology used herein is solely used for descriptive purposes and should not be construed as limiting in scope. Language such as "having," "containing," or "involving," and variations thereof, is intended to be broad and encompass the subject matter listed thereafter, equivalents, and additional subject matter not recited.

Furthermore, the description and examples are presented solely for the purpose of illustrating the different embodiments, and should not be construed as a limitation to the scope and applicability. While any composition or structure may be described herein as having certain materials, it should be understood that the composition could optionally include two or more different materials. In addition, the composition or structure may also include some components other than the ones already cited. It should also be understood that throughout this specification, when a range is described as being useful, or suitable, or the like, it is intended that any value within the range, including the end points, is to be considered as having been stated. Furthermore, respective numerical values should be read once as modified by the term "about" (unless already expressly so modified) and then read again as not to be so modified unless otherwise stated in context. For example, "a range of from 1 to 10" is to be read as indicating a respective possible number along the continuum between about 1 and about 10. In other words, when a certain range is expressed, even if a few specific data points are explicitly identified or referred to within the range, or even when no data points are referred to within the range, it is to be understood that the inventors appreciate and understand that any data points within the range are to be considered to have been specified, and that the inventors have possession of the entire range and points within the range.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

One or more implementations of various techniques for the integration of seismic data with downhole fluid analysis (DFA) to identify reservoir flow barriers and compartmentalization will now be described in more detail with reference to FIGS. 1-6 in the following paragraphs.

Production Environment

FIGS. 1.1-1.4 illustrate simplified views of a production field 100 having a subterranean formation 102 containing reservoir 104 therein in connection with various implementations described herein. The production field 100 may be an oilfield, a gas field, or the like, and may be on land or water.

FIG. 1.1 illustrates a diagrammatical view of a seismic survey operation being performed by a survey tool, such as a seismic truck 106.1, or marine seismic vessel (not shown), to measure properties of the subterranean formation 102 in connection with various implementations described herein. The survey operation may be a seismic survey operation for producing seismic waves through sound vibrations or acoustic signals. Seismic surveys may be sensitive to subsurface variations in acoustic impedance, the product of the seismic wave velocity and the density of subterranean formation. Seismic waves may be reflected and thereby detected by adjacent geological layers with different acoustic impedances. In FIG. 1.1, one such sound vibration 112, generated by source 110, may reflect off horizons 114 in earth formation 116. A set of sound vibrations may be received by sensors, such as geophone-receivers 118, situated on the earth's surface, or hydrophones (not shown) deployed beneath the surface of the water as part of a streamer array. The data received 120 may be digitized, and provided as input data to a computer 122.1 of a seismic truck 106.1, or marine vessel (not shown), and responsive to the input data, computer 122.1 generates seismic data output 124. This seismic data output 124 may be stored, transmitted, or further processed as desired, for example, by data reduction.

FIG. 1.2 illustrates a diagrammatical view of a drilling operation being performed by drilling tools 106.2 suspended by a rig 128, and advanced into the subterranean formations 102 to form a wellbore 136 in connection with various implementations described herein. Mud pit 130 may be used to draw drilling mud into the drilling tools via flow line 132 for circulating drilling mud down through the drilling tools, then up wellbore annulus 136 and back to the surface. The drilling mud may be filtered and returned to the mud pit. A circulating system may be used for storing, controlling, or filtering the flowing drilling mud. The drilling tools may be advanced into subterranean formations 102 to reach reservoir 104. Each well may target one or more reservoirs. The drilling tools may be adapted for measuring downhole properties using logging while drilling (LWD) tools. The LWD tools may also be adapted for taking core sample 133 as shown.

Computer facilities may be positioned at various locations about the production field 100 (e.g., the surface unit 134), or at remote locations. Surface unit 134 may be used to communicate with the LWD tools, or offsite operations, as well as with other surface or downhole sensors. Surface unit 134 may be capable of communicating with the LWD tools to send commands to the LWD tools, and to receive data therefrom. Surface unit 134 may also collect data generated during the drilling operation and produce data output 135, which may then be stored or transmitted.

Sensors (S), such as gauges, may be positioned about production field 100 to collect data relating to various production field operations as described previously. As shown, sensor (S) may be positioned in one or more locations in the drilling tools, and/or at rig 128 to measure drilling parameters, such as weight on bit, torque on bit, pressures, temperatures, flow rates, compositions, rotary speed, or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The BHA may include capabilities for measuring, processing, and storing information, as well as communicating with surface unit 134. The BHA may further include drill collars for performing various other measurement functions.

The BHA may include a communication subassembly that communicates with surface unit 134. The communication subassembly may be adapted to send signals to, and receive signals from the surface using a communications channel, such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It may be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan may set forth equipment, pressures, trajectories and/or other parameters that define the drilling process for the well site. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases, or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134, and various portions of the production field 100 or other locations. Surface unit 134 may also be provided with or functionally connected to one or more controllers (not shown) for actuating mechanisms at production field 100. Surface unit 134 may then send command signals to production field 100 in response to data received. Surface unit 134 may receive commands via transceiver 137, or it may execute commands to the controller. A processor may be provided to analyze the data (locally or remotely), make decisions, or actuate the controller. In this manner, production field 100 may be selectively adjusted based on the data collected. This technique may be used to optimize portions of the field operation, such as controlling drilling, weight on bit, pump rates, or other parameters. These adjustments may be made automatically based on computer protocol, or manually by an operator. In some cases, well plans may be adjusted to select optimum operating conditions, or to avoid problems.

FIG. 1.3 illustrates a diagrammatical view of a wireline operation being performed by a wireline tool 106.3, suspended by a rig 128, and lowered into the wellbore 136 in connection with various implementations described herein.

Wireline tool 106.3 may be adapted for deployment into wellbore 136 for generating well logs, performing downhole tests or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation, and may produce data output 135, which may be stored or transmitted. Wireline tool 106.3 may be positioned at various depths in the wellbore 136 to provide a survey, or other information relating to the subterranean formation 102.

Sensors, such as gauges, may be positioned about production field 100 to collect data relating to various field operations as described previously. Sensors may be positioned in wireline tool 106.3 to measure downhole parameters which relate to, for example porosity, permeability, fluid composition, and other parameters of the field operation.

FIG. 1.4 illustrates a simplified diagrammatical view of a production operation being performed by a production tool 106.4, deployed from a production unit, or Christmas tree 129, into the completed wellbore 136 to draw fluid from the downhole reservoirs into surface facilities 142 in connection with various implementations described herein. The fluid flows from reservoir 104 through perforations in the casing (not shown), and into production tool 106.4 in wellbore 136, and to surface facilities 142, via gathering network 146.

Sensors, such as gauges, may be positioned about production field 100 to collect data relating to various field operations as described previously. Sensors may be positioned in production tool 106.4, or associated equipment, such as Christmas tree 129, gathering network 146, surface facility 142, or the production facility, to measure fluid parameters, such as fluid composition, flow rates, pressures, temperatures, and other down hole parameters of the production operation.

Production may also include injection wells for added recovery. One or more gathering facilities may be operatively connected to one or more of the well sites for selectively collecting downhole fluids from the well site(s).

While FIGS. 1.2-1.4 illustrate tools used to measure properties of a production field, such as an oilfield or gas field, it may be appreciated that the tools may be used in connection with other operations, such as mines, aquifers, storage, or other subterranean facilities. Also, while certain data acquisition tools are depicted, it may be appreciated that various measurement tools capable of sensing parameters, such as seismic two-way travel time, density, resistivity, production rate, etc., of the subterranean formation and/or its geological formations may be used. Various sensors may be located at various positions along the wellbore, and/or the monitoring tools to collect, and/or monitor the desired data. Other sources of data may also be provided from offsite locations.

The field configurations of FIGS. 1.1-1.4 may be an example of a field usable with oilfield or gas field application frameworks. At least part of the production field 100 may be on land, water or sea. Also, while a single field measured at a single location may be depicted, oilfield or gas field applications may be utilized with any combination of one or more oilfields, and/or gas fields, one or more processing facilities, and one or more well sites.

The data collected from various sources, such as the data acquisition tools of FIGS. 1.1-1.4, respectively, or others not depicted, may then be processed and/or evaluated. The seismic data from the data acquisition tool 106.1 of FIG. 1.1 may be used by a geophysicist to determine characteristics of the subterranean formations, and identify features associated with oil and/or gas deposits. The core and/or log data from data acquisition tool 106.2 of FIG. 1.2, and/or data acquisition tool 106.3 of FIG. 1.3, may be used by a geologist to determine various characteristics of the subterranean formation. The production data from data acquisition tool 106.4 of FIG. 1.4 may be used by the reservoir engineer to determine fluid flow reservoir characteristics. The data analyzed by the geologist, geophysicist and the reservoir engineer may be analyzed to determine reservoir fluid geodynamics (RFG) for the purpose of flow assurance. The data analyzed by the geologist, geophysicist, and the reservoir engineer may be analyzed using modeling techniques.

Attention is now directed to methods, techniques, and workflows for processing, and/or transforming collected data that are in accordance with some implementations. Some operations in the processing procedures, methods, techniques, and workflows disclosed herein may be combined, and/or the order of some operations may be changed. In the geosciences and other multi-dimensional data processing disciplines, various interpretations, sets of assumptions, or domain models such as velocity models, may be refined in an iterative fashion. This iterative refinement can include use of feedback loops executed on an algorithmic basis, such as via a computing system, as discussed later, and/or through manual control by a user who may make determinations regarding whether a given action, template, or model has become accurate.

Analyzing a Reservoir

As mentioned above, a reservoir disposed in a subterranean formation may contain hydrocarbons. In particular, the hydrocarbons may develop from the thermal cracking of organic matter deposited in source rocks as they are buried deeper in the earth's crust by the deposition of newer sediments. Fluids containing these hydrocarbons may eventually be expelled from the source rock and migrate, such as through faults and fractures, until they are trapped in a reservoir rock. Such migration of hydrocarbons may be referred to as a primary charge. In particular, reservoir fluids disposed in these reservoirs may contain hydrocarbons, where the hydrocarbons may take the form of oil, gas condensate, and/or the like.

In one scenario, if the migration of fluids ceases and the reservoirs behave as a closed system, then the reservoir fluids may eventually reach a state of chemical and thermodynamic equilibrium. Gravity may act as a force on the reservoir. In addition, depending on the length of the hydrocarbon column and the hydrocarbon composition, there may be composition gradients within the reservoir. However, some reservoirs may not behave as an ideal closed system as described above. Instead, one or a combination of the following situations may occur: geologic events may alter the reservoir structure after the primary charge, more thermally mature fluids, such as gas, may arrive to the reservoir, this may be referred to as a secondary charge or late gas charge, hydrocarbons may escape via flow channels or a compromised cap seal, biodegradation at sufficiently low temperature and mixing with biogenic methane, biogenic methane arriving at the reservoir, water washing or the like.

Such reservoirs may have reservoir fluids which exist in a state of non-equilibrium, and the fluid composition may not be homogeneous In another scenario, the reservoir may be compartmentalized such that it lacks a level of spatial connectivity within reservoir units (i.e., parts of the reservoir). A compartmentalized reservoir may consist of two or more compartments that effectively are not in hydraulic communication. Two types of reservoir compartmentalization may include vertical and lateral compartmentalization. Vertical compartmentalization may occur as a result of buoyant rising salt migrating into an overlying reservoir rock formation and creating a salt keel within the reservoir. Vertical compartmentalization may also be the result of sealing barriers such as shale. Lateral compartmentalization may occur as a result of faulting or stratigraphic changes in the reservoir.

Reservoir compartmentalization as well as non-equilibrium hydrocarbon distribution can significantly hinder production and may make the difference between an economically-viable field and an economically-nonviable field. Techniques aimed at understanding reservoir fluid geodynamics (RFG), and thereby accurately describing reservoir compartments and their distribution, as well as non-equilibrium hydrocarbon distribution, may allow an operator to develop a downhole fluid analysis (DFA) program to minimize the economic risk associated with the presence of these features, and may ultimately raise production. However, distinguishing compartmentalization using data obtained from seismic surveys, and/or downhole tool logs by traditional methods may be difficult due to the low seismic velocity contrast and small size of the compartmentalization fractures or boundaries.

In one implementation, and as further described below, an integration of seismic analysis and DFA may be used to provide information that can be used to accurately detect compartmentalization and/or non-equilibrium hydrocarbon distribution in the reservoir of interest. In particular, seismic analysis and DFA may be used to identify dip angles and variations in fluid properties of the reservoir, which may in turn be used to detect compartmentalization, and/or non-equilibrium hydrocarbon distribution in the reservoir.

Integration of Seismic Data and Downhole Fluid Analysis (DFA)

In one implementation, and as further described below, an integration of seismic analysis with DFA may be used to provide information that may be used to accurately identify flow or sealing barriers and their distribution in the reservoir of interest. In particular, seismic analysis and downhole fluid analysis may be used to identify subsurface features and fluid markers that may be associated with compartmentalization and/or non-equilibrium hydrocarbon distribution in the reservoir.

FIG. 2 illustrates a flow diagram of a method 200 for the integration of seismic data with DFA to predict the location flow barriers, and thereby accurately detect compartmentalization and/or non-equilibrium hydrocarbon distribution in accordance with various implementations described herein. In one scenario, the method 200 uses seismic data in combination with DFA to understand reservoir fluid geodynamics (RFG). Understanding of RFG may help predict the presence of reservoir flow barriers, and their location within the reservoir. An operator of reservoir may wish to obtain this information for many reasons, for example to take into account the economic risk associated with the presence of these flow barriers in a well development and/or DFA program. An operator may wish to generate a model of reservoir fluid connectivity and distribution within the reservoir to determine the economic risk of compartmentalization, or for flow assurance purposes.

In one implementation, method 200 may be performed by one or more computer applications, where the computer applications may implement one or more of the electronics and processing system, controller of the fluid analysis module, and/or the computer system described below. It should be understood that while method 200 indicates a particular order of execution of operations, in some implementations, certain portions of the operations might be executed in a different order. Further, in some implementations, additional operations or blocks may be added to the method. Likewise, some operations or blocks may be omitted.

Figure 3:
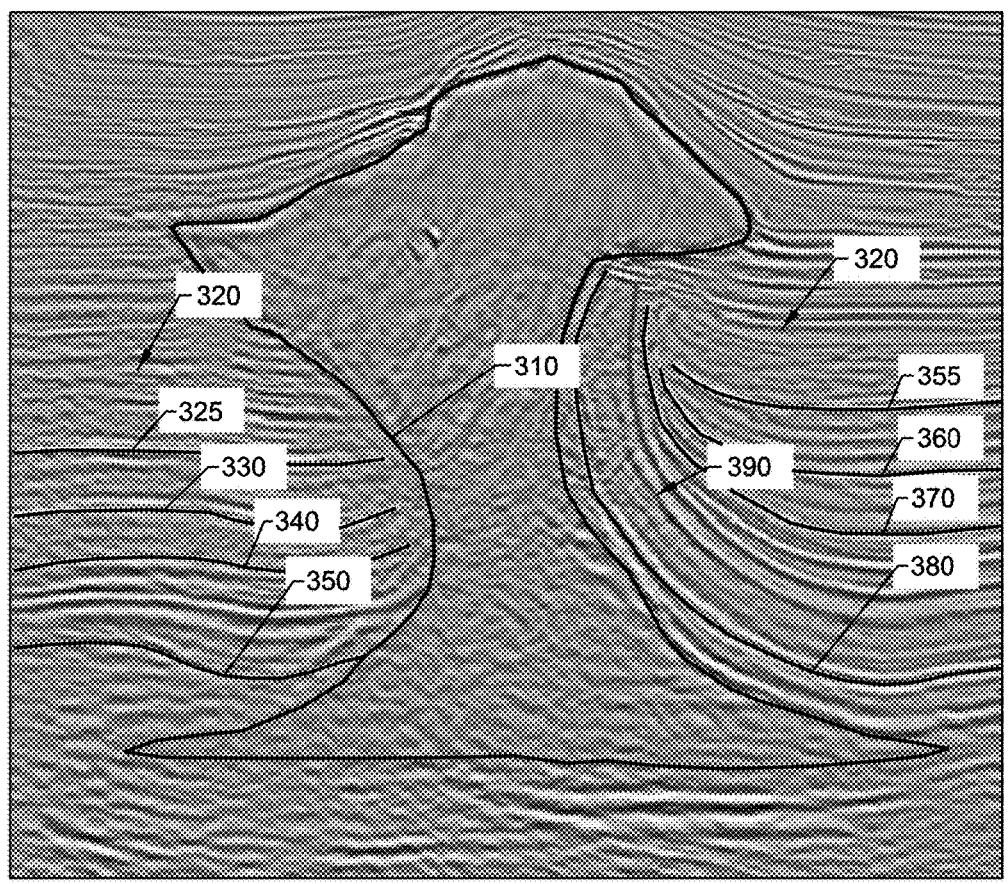
FIG. 3 illustrates a diagrammatical view of a 2D seismic data plot in accordance with various implementations described herein.

At block 210, seismic data may be received from one or more seismic survey operations performed by a survey tool, such as the seismic truck 106.1 of FIG. 1.1, or marine seismic vessel. In one implementation, the land and/or marine seismic data may have been acquired as part of a 2D or 3D survey exploration process to identify subterranean geological formations associated with hydrocarbon deposits in connection with various implementations described herein. In a further implementation, the seismic data may be time-lapse, or 4D seismic data obtained from repeated seismic production surveys over a producing hydrocarbon reservoir, which may be used to determine changes within the reservoir that may be the result of hydrocarbon production, or injection of water, and/or gas into reservoir as part of a well development program. In yet another implementation, seismic data may have been acquired as part of method 200. An example of a simplified diagrammatical view of a 2D seismic data plot in accordance with various implementation described herein is depicted in FIG. 3.

At block 220, seismic data from one or more seismic survey operations may be processed to identify subterranean geological features associated with flow barriers and baffles, which may interfere with the migration and distribution of hydrocarbon fluid from primary and/or secondary charging. Flow barriers may block the migration of hydrocarbons, while baffles may restrain or regulate, resulting in compartmentalization and/or non-equilibrium hydrocarbon distribution in the reservoir.

In one scenario these subterranean geological features may be the result of salt migration. Salt formations may become buoyant and pliable under high pressure and temperature and may migrate into an overlying reservoir sedimentary rock formation resulting in a salt keel. FIG. 3 illustrates a 2D seismic data of a salt keel punching through an overlying reservoir formation. In one scenario, a salt keel may cause the substantially horizontal reservoir sedimentary rock layers in the region of the salt keel to deform, curl, rollover and/or fracture, thereby causing compartmentalization. As a result, the sedimentary formations in the region of the salt keel may deviate from the horizontal. This deviation of the sedimentary layers from the horizontal may be referred to as a dip angle. Steeply inclined layers have large dip angles, while nearly horizontal layers have small dip angles. Dip angles may be associated with compartmentalization, which may be vertical, and/or non-equilibrium hydrocarbon distribution. In one implementation, there may be compartmentalization if the dip angle in any section of the deformed reservoir rock layer exceeds a predetermined threshold value, for example about 30 degrees (30°).

Accordingly, in method 200, the seismic data is analyzed at block 220 to identify geological formations with dip angles greater than about 30 degrees, which may be used to predict the location of compartmentalization. In another implementation, the seismic data at block 220 may be processed to enhance the analysis and/or measurement of the dip angle.

At block 230, preliminary DFA fluid samples may be taken at one or more DFA measurement stations of a wellbore, at different locations within the reservoir according to a DFA program. The preliminary DFA fluid samples may be taken during drilling or thereafter. The preliminary DFA samples may be taken substantially at locations within those sections of the geological formation identified at block 220 that have dip angles greater than about 30 degrees. Since the cost associated with each wellbore may be high, especially in deep water drilling, in one implementation, the DFA may be performed at different DFA measurement stations locations within a single wellbore to minimized expenditure. In a further implementation, one or more of the DFA measurement stations may be located within one or more side track or offset wellbores. In yet another implementation, the drilling plan may be modified based on the identification of one or more geological features associated with compartmentalization at block 220. For example, the drilling plan may be modified to intercept more of the geological formation identified at block 220 that are associated with compartmentalization, which may necessitate additional DFA measurement stations within this region.

In one implementation, preliminary fluid samples may be obtained using a downhole tool, such as those described below with respect to FIGS. 4 and 5. Further, as described below with respect to FIGS. 4 and 5, a computing application associated with a fluid communication module, and/or fluid analysis module may be used to determine the preliminary DFA data in substantially real time. In a further implementation, the computing application associated with the fluid communication module and/or fluid analysis module may operate in conjunction with a surface computing application, such as the electronics and processing system 506, to determine the first DFA data. The details of DFA are provided below in a section labeled Downhole Fluid Analysis.

At block 240, a preliminary first fluid sample may be received from a first measurement station from which DFA data (first) may be determined. The preliminary DFA data may include one or more measurements of fluid fluorescence, fluid composition, fluid color, the gas-oil ratio (GOR), acidity, asphaltene content, temperature, pressure, fluid viscosity, fluid density, fluid resistivity, pH or $H_2S$ levels, mobility, optical density, florescence, concentrations of several alkane components and groups in the preliminary first fluid sample (e.g., fractional amounts of $C_1$, $C_2$, $C_3$-$C_5$, $C_{6+}$, $CO_2$, $H_2O$, and the like), and/or the like.

The first DFA data may be analyzed for fluid markers and fluid density inversions which may be associated with compartmentalization and/or non-equilibrium hydrocarbon distribution. In one implementation, these fluid markers may include the asphaltene content of the hydrocarbon reservoir, dissolved gas analysis (DGA) (dissolving gas) and hydrocarbon mass density. The DFA data may be analyzed by optical, photoacoustic, or other techniques known to a person of ordinary skill in the art.

At block 250, a preliminary second fluid sample may be received from a second measurement station from which DFA data (second) may be determined. The second fluid sample may be obtained in a similar manner as the first fluid sample, and the second DFA data may be determined in a similar manner as the first DFA data. In one implementation, the second measurement station while at a different location than the first measurement station, may be located proximate to, and/or within those geological formations identified at block 220 that have a dip angle greater than about 30 degrees.

At block 260, one or more equations of state (EOS) models of the thermodynamic behavior of the reservoir fluid may be used to predict the reservoir DFA data at different locations within the reservoir. In one implementation, the first DFA data determined at block 240 from the first fluid sample may be used to predict the second DFA data determined at block 250. In a further implementation, one or more EOS may be used to predict the first DFA data using the second DFA data. Although various techniques described herein are with reference to a reservoir, it should be understood that in some implementations the techniques may be applied to a wellbore.

In another implementation, a surface computing system, such as the electronics and processing system, may predict the fluid properties and/or fluid behavior using one or more EOS models. The estimated fluid properties of the reservoir may include: GOR, condensate-gas ratio (CGR), fluid color, density of each phase, volumetric factors and compressibility, heat capacity, saturation pressure (i.e., bubble or dew point), optical density, the distribution of a solid fraction of the reservoir fluid (e.g., asphaltenes, resins, and/or the like), viscosity, and/or the like. In yet another implementation, EOS models may estimate the fluid properties and/or fluid behavior as a function of depth, such that the fluid properties and/or fluid behavior are predicted for one or more additional measurement stations in the reservoir. In such an implementation, the surface computing system may perform the estimations based on the first DFA data. In another implementation, the surface computing system may perform the estimations based on the second DFA data and/or DFA data from multiple measurement stations.

At block 270, the second DFA data may be compared to the predicted DFA. In comparing the second DFA data to the predicted DFA data, it may be assumed in one implementation, that the reservoir at the first location and the reservoir at the second location are connected and in thermodynamic equilibrium. Thus, the second DFA data may be used to confirm the expected reservoir architecture.

In particular, connectivity, thereby non-compartmentalization and/or equilibrium of the reservoir may be implied if the second DFA data and the predicted DFA data differ by less than a predetermined threshold amount. This implication may be made since the one or more EOS models assume connectivity and equilibrium within a reservoir, and thereby moderately decreasing GOR values with increasing depth, a continuous increase of asphaltene content, as a function of depth, a continuous increase of fluid density and/or fluid viscosity as a function of depth, and/or the like. Accordingly, the use of the one or more EOS models to determine predicted DFA data may offer a baseline for the reservoir against which the second DFA data can be compared. Agreement between the second DFA data and the predicted DFA data may imply connectivity between the first and second spatial locations.

If the second DFA data differs from the predicted DFA data by a predetermined threshold amount, it may then be determined that there is compartmentalization, a non-equilibrium hydrocarbon distribution, and an absence of spatial connectivity caused by one or more sealing barriers. In one implementation, compartmentalization and/or non-equilibrium may be inferred in those reservoir areas experiencing mass density inversion. Mass density inversion may be inferred from a reversing trend in GOR, such as if higher GOR is found lower in the fluid column and by finding dissolving gas near the bottom of the fluid column. It may also be inferred from discontinuous asphaltene content or higher asphaltene content fluids being found higher in the fluid column. It may also be inferred by discontinuous fluid density and/or fluid viscosity, or if heavier oil, or a higher fluid density and/or fluid viscosity is found higher in the fluid column. Lastly, it may be inferred by variations in fluid composition, and fluid properties as indicated by the secondary DFA data, which are larger than those of the predicted DFA data, and/or the like. In another implementation, the threshold amount may be equal to or greater than a monotonic variation between the second DFA data and the predicted DFA data.

Compartmentalization may also be associated with mass density inversion, whereby a greater concentration of asphaltene may be located substantially near the top of a fluid column. For example, mass density inversion may be associated with heavier oil being located substantially near the top of the fluid column, and dissolving gas located substantially near the bottom of the column. In a further example, compartmentalization may be inferred by differing fluid-properties between wells or between reservoir units in a single well.

At block 280, the DFA program may be modified based on the analysis at block 270. The DFA program may be modified to obtain one or more additional fluid samples from one or more additional measurement stations. The additional fluid samples may be obtained in a similar manner as the first and second fluid sample, and additional DFA data may also be obtained in a similar manner as the first and second DFA data.

In one implementation, the DFA program may be modified for the purpose of identifying those sections of the reservoir formation which are not compartmentalized and/or in non-equilibrium, and therefore have a normal mass density distribution. The DFA program may be modified such that the one or more additional fluid samples may be obtained from measurement stations located in sections of the reservoir formation that have dip angles of about 30 degrees or less. In a further implementation, additional fluid samples may be obtained substantially towards the base of the reservoir hydrocarbon column. In yet another implementation, the DFA program may be modified to look for a sizeable non-compartmentalized section of reservoir hydrocarbon column with a normal distribution of hydrocarbon fluids. For example, as determined by the color of the oil progressively transitioning from light yellow and/or blue to darker black and/or brown with depth. In yet another implementation, the drilling plan may be modified to facilitate this, for example one or more side track or offset wellbores may be drilled to facilitate the additional measurement stations.

In yet another implementation, the DFA program may be modified for the purpose of confirming the preliminary DFA determination of mass density inversion, compartmentalization and/or non-equilibrium. As such, the additional measurement stations may also be located substantially around those geological formations identified at block 220 that have a dip angle greater than about 30 degrees. Further, the drilling plan may be modified to facilitate this.

In one scenario, the additional DFA data may also include one or more measurements of optical density, fluid color, fluid fluorescence, fluid composition, GOR, temperature, pressure, viscosity, fluid density, resistivity, pH or $H_2S$ levels, concentrations of several alkane components and fractional amounts of $C_1$, $C_2$, $C_3$-$C_5$, $C_{6+}$, $CO_2$, $H_2O$, and/or the like.

In one implementation, DFA may be further combined with core analyses, mud logging analyses of drilled rock cuttings, basic petrophysical logs (gamma-ray, resistivity, and neutron-density), advanced petrophysical logs (elemental analysis logs, magnetic resonance logs, and porosity logs), and mobility measurements from a formation tester to further identify heavy hydrocarbons.

In one example, DFA data may be integrated with such analysis to provide information of field-wide or localized fluid instabilities, which may give rise to departures from the baseline thermodynamic equilibrium state and may provide information for field development planning. In another example, this may provided information for developing a fluid model of the hydrocarbon reservoir in real time. The fluid model may be used to understand the properties and distribution of hydrocarbon fluids in a reservoir formation.

In sum, analyzing a reservoir using seismic data with DFA, as described above, may provide information that can be used to determine reservoir fluid geodynamics for a reservoir of interest. For example, reservoir fluid geodynamics may be used to determine whether there has been a geological occurrence associated with the formation of flow barriers and baffles, such as salt migration causing a reservoir formation to deform, curl, rollover and/or fracture. In particular, the integration of seismic data with DFA may be used to identify the presence of and location of compartmentalization and/or non-equilibrum.

FIG. 3 illustrates a diagrammatical view of a 2D seismic data plot in accordance with various implementations described herein. The 2D seismic data may have been acquired before drilling operations commenced as part of a 2D survey exploration process to identify subterranean geological formations associated with hydrocarbon deposits. The seismic data may have been acquired as time-lapse seismic data. This time lapsed seismic data may have been obtained from repeated seismic production surveys over a producing hydrocarbon reservoir, and may be used to determine changes within the reservoir. These changes may be the result of hydrocarbon production, or injection of water and/or gas into reservoir as part of a well development program. In one implementation, the 2D seismic data may have been acquired as part of the method 200 described herein.

The horizontal axis of the 2D seismic data represents distance. The vertical axis represents the time it takes for the reflections from a controlled energy source to reach a plurality of receivers, from which it may be possible to estimate the depth of the geological feature causing the reflections. In one scenario, the horizontal axis may be further subdivided into increments. The increments may make it easier for a user to visualize the size of geological features depicted in the seismic data, and/or may be representative of the seismic survey bucket or bin size. The vertical axis may also be subdivided into increments, which may make it easier for a user to visualize the depth of geological features depicted in the seismic data.

The seismic data plot may indicate the presence of geological features associated with compartmentalization and/or non-equilibrium hydrocarbon distribution. An example of one such geological feature, a salt keel 310, is shown in FIG. 3. As disclosed herein, a salt keel 310 may be the result of buoyant salt punching through an overlying reservoir formation 320-380 (hereafter 320) and/or trap. The reservoir formation 320 may comprise of substantially horizontal layers of sedimentary rock, such as sandstone and shale. An underlying salt formation may have become buoyant and pliable as a result of being exposed to high temperatures and pressures. Over time the salt may migrate, causing the overlying sedimentary formation 320 to deform, curl, rollover and/or fracture. This process may create flow or sealing barriers, which may be vertical or horizontal, resulting compartmentalization and/or non-equilibrium gradients.

As disclosed herein, the boundary between the salt keel 310, and the reservoir formation 320, is referred to as a salt weld. A salt weld may act as a charging conduit (primary and/or secondary), for a subsurface leakage of hydrocarbon fluid and/or gas from a poorly sealed hydrocarbon formation. While the resolution of the seismic survey may be insufficient to identify the presence of a salt weld directly, its presence may be inferred if there are bright spots proximate to the boundary between the salt keel 310 and reservoir formation 320. Bright spots may be associated with gas loading of a hydrocarbon reservoir 320, and may be caused by gas collecting in porous rock formations (pockets). The gas collected in these pockets may create a stronger seismic reflection, and thereby higher acoustic contrast, than porous rock filled with a fluid such as water and/or the adjacent rock formations. The higher acoustic contrast may be the result of the reduced velocity of sound passing through porous rock formations containing gas.

As disclosed herein, hydrocarbons may develop from the thermal cracking of organic matter deposited in source rocks as they are buried deeper in the earth's crust by the deposition of newer sediments. Fluids from these source rocks may be expelled over time through faults and fractures until they are trapped in a reservoir rock formation such as 320. Since thermal cracking is an ongoing process, and the fluids are expelled over a period of time, the composition of the expelled fluids may not be homogenous. As such, any charge, primary and/or secondary, may comprise of heterogeneous, rather than homogenous fluid, whereby the heaviest fluid will charge first, followed by a progressively lighter charge. This lighter charge may comprise of lighter fluid, gas condensate, and/or the like. The deformation of reservoir formations, as a result of salt migration, may provide charging pathways for hydrocarbons associated with charging to enter the reservoir 320, where they may become trapped in different stages of their charge history.

For example, because of their relatively small dip angles, the fractured ends of reservoir layers 325, 330, 340 and 350, are buttressed against, or interface with the salt keel 310 and its associated charging weld. DFA fluid samples obtained from DFA measurement stations within these sedimentary layers will reflect the charging history, and may therefore be used to confirm the expected reservoir architecture. Assuming connectivity between spatial locations within these reservoir layers, and thermodynamic equilibrium, the DFA data will reflect a heterogeneous charge. In particular, connectivity (i.e., non-compartmentalization) and equilibration of the reservoir may be indicated by moderately decreasing GOR values with increasing depth, a continuous increase in asphaltene content, fluid density and/or fluid viscosity as a function of depth. Lastly the color of the oil may also vary with depth, progressively transitioning from light yellow and/or blue to darker black and/or brown with depth.

However, because of their relatively large dip angles, in particular those associated with layer 380, the fractured ends of sedimentary layers 355, 360, 370 and 380 are not buttressed against the salt keel 310 and its associated charging weld. Again, DFA fluid samples obtained from within these sedimentary layers will reflect the charging history. However, in this example, progressive salt migration has caused these sedimentary layers to deform, curl and in some instances rollover and/or fracture over a protracted period of time. For example, in the case of sedimentary layer 380, the dip angle is so noticeable that sedimentary rollover has occurred, whereby its underside is now buttressed against or interfacing with the salt keel 310 and its associated charging weld. If the underside of layer 380 comprises low permeability shale, there will not be a charging conduit into the body of reservoir formation 380. Since the dip angle will have increased with time, and since the initial hydrocarbons coming out the source formation will be heavier, the fluid trapped within sedimentary layer 380, and any DFA fluid analysis of 380 may reflect this. Further, the hydrocarbon fluid within layer 380 may also be less heterogeneous than those within layers 325, 330, 340 and 350.

In addition, since the reservoir comprises sedimentary layers of relatively brittle material, regions of high dip angle will experience compartmentalization as a result of fracturing. For example, within sedimentary layer 380 there will be multiple compartments as a result of multiple fractures within location 390. These fractures will be transverse to the longitudinal deformation of the sedimentary layer 380. As a result, heavy hydrocarbons may become trapped higher in the reservoir column. Further, the fractures may not act as charge conduits into the interior of reservoir formation 380, since the fractures may be subject compression forces and may be plugged by pliable impermeable shale flowing into them.

In another scenario, the charge, and therefore lighter hydrocarbons, may still be able to enter via the flanks (not shown) of the sedimentary layer 380, where there is less deformation and a smaller dip due to the salt keel 310. This may result in mass density inversion because the flanks will be lower than the regions that compartmentalized as a result of fracturing due to a high dip angle, and therefore contain the initial heavier charge. In this scenario the salt keel 310 may cause lateral, as well as vertical flow barriers and/or baffles.

Downhole Fluid Analysis

As mentioned above, DFA may be used in conjunction with seismic analysis to identify variations in fluid properties of the reservoir, which may in turn be used to detect heavy hydrocarbons, compartmentalization and/or non-equilibrium hydrocarbon distribution in the reservoir. In particular and as further described below, DFA may provide, in real time or substantially real time, geochemical information used to identify fluid generation pathways, biodegradation, reservoir tops, fault, and cap rock sealing properties, reservoir compartmentalization, fluid associations, and/or the like for the reservoir of interest. In such an implementation, DFA may be used to identify whether the reservoir contains considered biogenic or thermogenic material.

As will be described with respect to FIGS. 5-6, DFA and may provide hydrocarbon and non-hydrocarbon ($CO_2$) composition information to generate one or more models of reservoir fluid in the reservoir of interest.

For example, measurements obtained using DFA at different spatial locations in the reservoir may be contrasted with a prediction model derived from these measurements. In one implementation, agreement between the measurements and the model may imply connectivity between the spatial locations, provided that the fluid samples obtained from the spatial locations are in thermodynamic equilibrium.

On the other hand, disagreement between the measurements and the model may be further investigated to identify possible causes of instability that preclude thermodynamic equilibrium. As noted above, such causes may include geologic events that may alter the reservoir structure after the primary charge, thermally mature fluids that may arrive to the reservoir (secondary gas charging), hydrocarbons that may escape via flow channels or a compromised cap seal, ongoing and/or prior biodegradation at sufficiently low temperature and mixing with biogenic methane, biogenic methane arriving at the reservoir, water washing, and/or the like. In addition, analyzed data from the DFA, and seismic surveys could be used better understand RFG, and thereby to ascertain information relating to migration of the reservoir fluids, origin of the fluids, composition of the fluids, and/or the like.

Various implementations of well site systems described herein may be used to employ an integration of DFA and Seismic survey data, including a well site system that combines one or more implementations discussed below with respect to FIGS. 5 and 6 beneath.

After conducting the DFA of one or more reservoir fluid samples, the results of the DFA may be related to one or more equation of state (EOS) models of the thermodynamic behavior of the reservoir fluid in order to characterize the reservoir fluid at different locations within the reservoir. In particular, computer-based modeling and simulation techniques may use the EOS models to estimate the fluid properties and/or behavior of reservoir fluid within the reservoir. In one implementation, a surface computing system, such as the electronics and processing system 506 described below, may estimate the fluid properties and/or fluid behavior using the EOS models. In such an implementation, the surface computing system may perform the estimations based on received DFA data. The received DFA data may include measurements and/or calculations for optical density, fluid fluorescence, fluid composition, the GOR, pressure, volume, temperature, fluid density, fluid viscosity, and/or the like.

The EOS models may represent the phase behavior of the reservoir fluid, and can be used to compute fluid properties, such as: GOR, condensate-gas ratio (CGR), density of each phase, volumetric factors and compressibility, heat capacity and saturation pressure (bubble or dew point). Thus, the EOS models can be solved to obtain saturation pressure at a given temperature. Moreover, GOR, CGR, phase densities, and volumetric factors may be byproducts of the EOS models. Transport properties, such as heat capacity or viscosity, can be derived from properties obtained from the EOS models, such as fluid composition.

Further, the EOS models can be extended with other reservoir evaluation techniques for compositional simulation of flow and production behavior of the petroleum fluid of the reservoir, as is known in the art.

Further, an EOS that describes the distribution of a solid fraction of the reservoir fluid (e.g., asphaltenes, resins, and/or the like), may be used. In one implementation, such EOS may include the Flory-Huggins-Zuo EOS, which may be used with the Yen-Mullins model, which describes the physical nature of asphaltenes in crude. Such a combination may be used to provide a description of a baseline thermodynamic equilibrium state of a hydrocarbon column that includes gas, liquid, and solid petroleum components.

In one implementation, an EOS model may predict compositional gradients with depth that take into account the impacts of gravitational forces, chemical forces, temperature gradient, and/or the like. To calculate compositional gradients with depth in a hydrocarbon reservoir, it may be assumed that the reservoir fluids are connected (i.e., there is a lack of compartmentalization) and in thermodynamic equilibrium. In particular, it may be assumed that the reservoir fluids are in thermodynamic equilibrium with substantially little adsorption phenomena, addition of matter to the reservoir, pressure gradients other than gravity, heat fluxes across system boundaries, and/or chemical reactions in the reservoir.

Further, in order to identify variations in fluid properties of the reservoir via a downhole fluid analysis (DFA), one or more in situ reservoir fluid samples may be withdrawn using a downhole tool, or formation tester disposed within a wellbore. In particular, the reservoir fluid samples may be withdrawn from one or more reference points disposed in the wellbore. A reference point in the wellbore may be referred to as a measurement station.

As further discussed above, the DFA may then be performed at one or more measurement stations to determine one or more fluid properties of the reservoir fluid, including, but not limited to, gas-oil ratio (GOR), fluid composition (e.g., fractional amounts of $C_1$, $C_2$, $C_3$-$C_5$, $C_{6+}$, $CO_2$, and the like), acidity of the fluids (e.g., pH), fluorescence, optical density, fluid resistivity, fluid density, and fluid viscosity. The downhole tool may also provide measurements of pressure, temperature, and mobility of the reservoir rock. As noted above, variations in such fluid properties may indicate the presence of heavy hydrocarbons, compartmentalization, and non-equilibrium hydrocarbon distribution in the reservoir.

The DFA may be performed on the reservoir fluid samples during drilling or thereafter. In one implementation, the reservoir fluid samples may be analyzed downhole during a pause in drilling operations, during which the downhole tool may acquire the fluid samples and transmit results of the DFA to an acquisition unit at the surface. In another implementation, the reservoir fluid samples may be analyzed on the surface after the drilling operations have finished, where the downhole tool may acquire the fluid samples and subsequently transmit the fluid samples to the surface for other fluid analysis to be performed. In yet another implementation, the DFA may be performed in real-time or substantially real-time.

Downhole Fluid Analysis Systems

Figure 4:
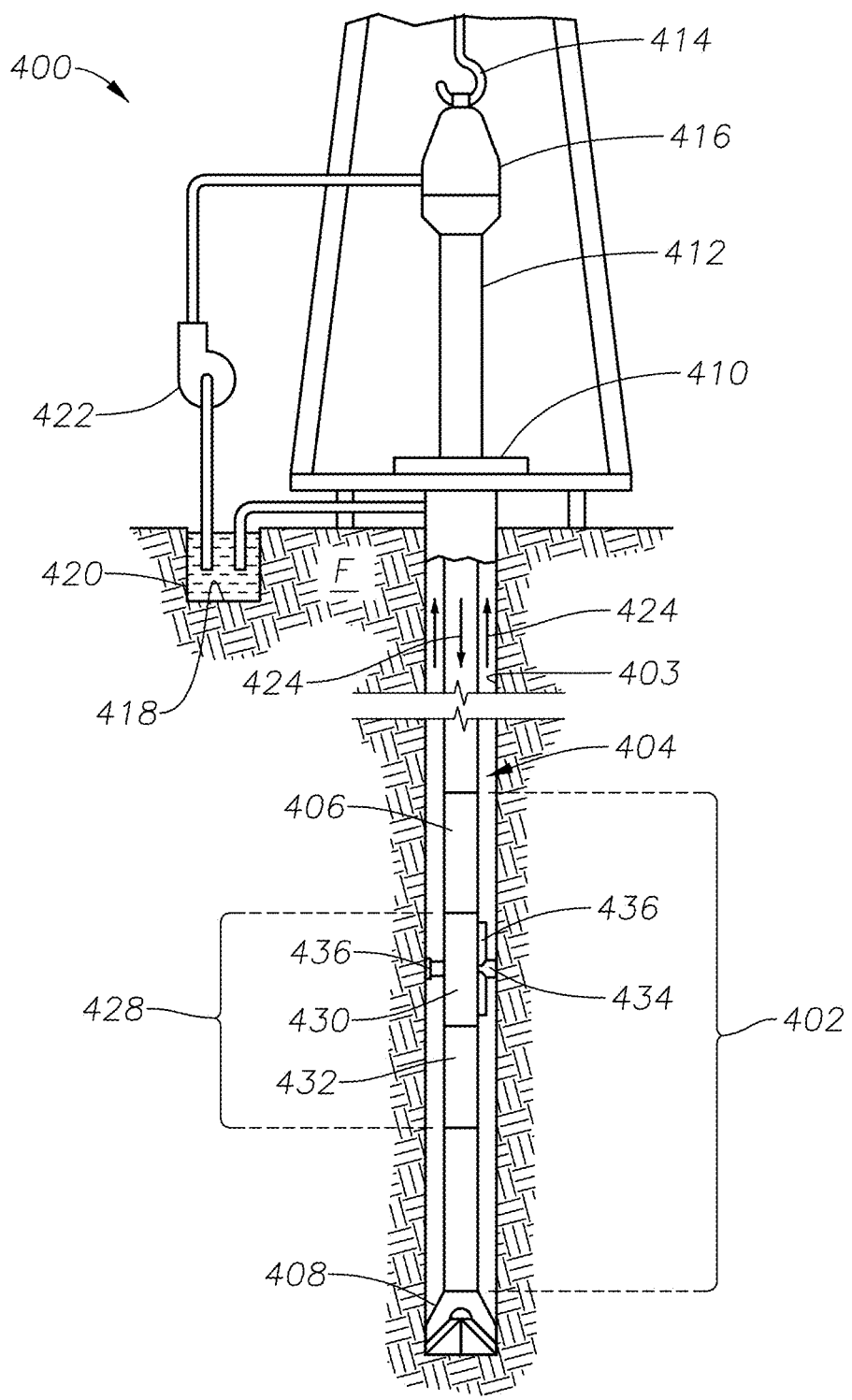
FIG. 4 illustrates a rig with a downhole drilling tool in accordance with various implementations described herein.
Figure 5:
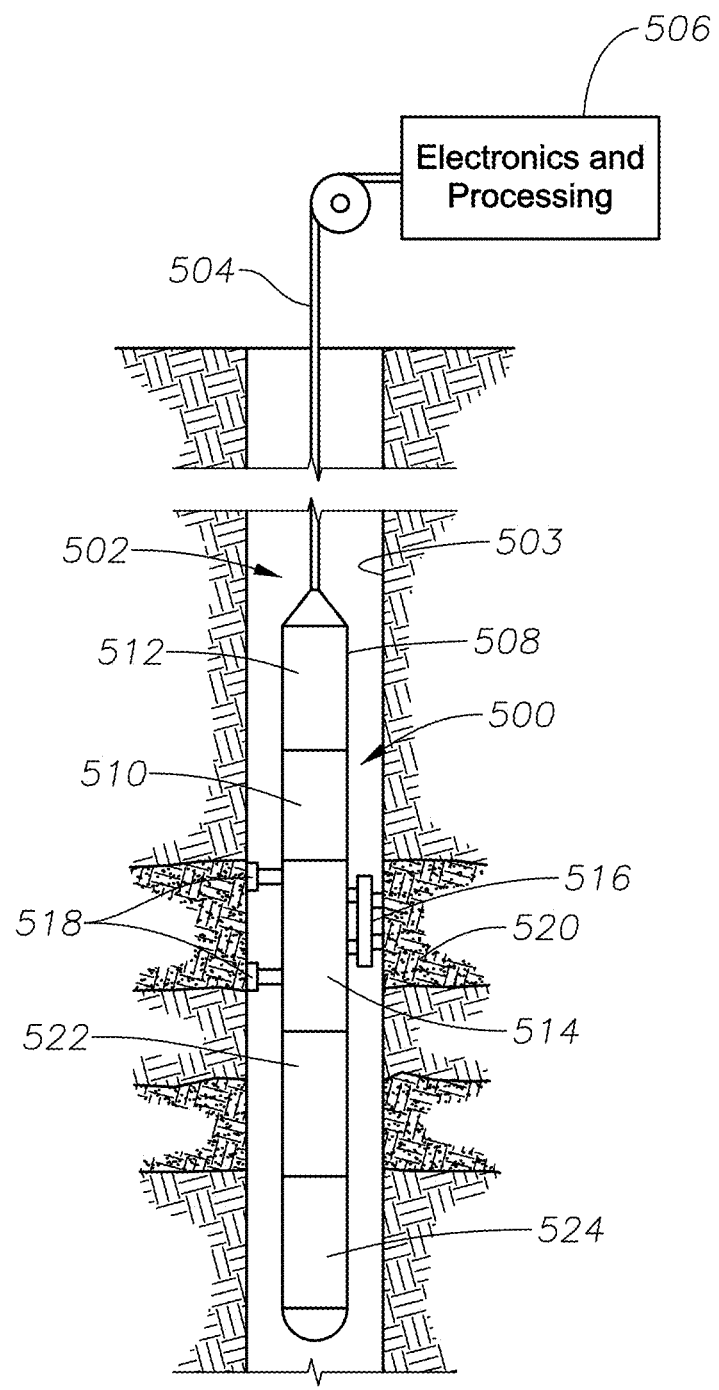
FIG. 5 illustrates a downhole wireline tool in accordance with implementations of various technologies and techniques described herein.

FIGS. 4 and 5 illustrate various implementations of well site systems that may employ DFA systems and techniques. In one implementation, FIG. 4 illustrates a rig 400 with a downhole tool 402 in accordance with implementations of various technologies and techniques described herein. In particular, FIG. 4 depicts the downhole tool 402 as being suspended from the rig 400 and into a wellbore 404 via a drill string 406. The rig 400 may be similar to the rig 128 of FIGS. 1.2-1.3. The downhole tool 400 may have a drill bit 408 at its lower end that may be used to advance the downhole tool 400 into the formation, and may also be used to form the wellbore 404. The drill string 406 may be rotated by a rotary table 410 energized by a powering means (not shown), where the rotary table 410 may engage a Kelly joint 412 at the upper end of the drill string 406. The drill string 406 may be suspended from a hook 414 attached to a traveling block (not shown). In particular, the drill string 406 may be suspended through the Kelly joint 412 and a rotary swivel 416 that permits rotation of the drill string 406 relative to the hook 414. The rig 400 may be a land-based platform and derrick assembly used to form the wellbore 404 by rotary drilling. However, in other implementations, the rig 400 may be an offshore platform.

Drilling fluid or mud 418 may be stored in a pit 420 formed at the well site. A pump 422 may deliver the drilling fluid 418 to the interior of the drill string 406 via a port in the swivel 416, inducing the drilling fluid to flow downwardly through the drill string 406 as indicated by a directional arrow 424. The drilling fluid may exit the drill string 406 via ports in the drill bit 408, and then circulate upwardly through the region between the outside of the drill string and the wall of the wellbore, called the annulus, as indicated by directional arrows 426. The drilling fluid may lubricate the drill bit 408 and carry formation cuttings up to the surface as the fluid is returned to the pit 420 for recirculation.

The downhole tool 402 may sometimes be referred to as a bottom hole assembly (BHA), where the downhole tool 402 may be positioned near the drill bit 408. The BHA of FIG. 4 may be similar to the BHA of FIG. 1.2. The downhole tool 402 may include various components with capabilities, such as measuring, processing, and storing information, as well as communicating with the surface. A telemetry device (not shown) also may be provided for communicating with a surface unit (not shown).

The downhole tool 402 may also include a sampling system 428, where the sampling system 428 includes a fluid communication module 430 and a sampling module 432. The modules may be housed in a drill collar for performing various formation evaluation functions, such as pressure testing, sampling, and/or the like. As shown in FIG. 4, the fluid communication module 430 may be positioned adjacent to the sampling module 432. However, the position of the fluid communication module 430, as well as other modules, may vary in other implementations. Additional devices, such as pumps, gauges, sensor, monitors, and/or other devices usable in downhole sampling and/or testing may also be used. The additional devices may be incorporated into modules 430 and 432 or disposed within separate modules included within the sampling system 428.

The fluid communication module 430 may include a probe 434, where the probe 434 may be positioned in a stabilizer blade or rib 436. The probe 434 may include one or more inlets for receiving reservoir fluid and one or more flow lines (not shown) extending into the downhole tool for passing fluids through the tool. In another implementation, the probe 434 may include a single inlet designed to direct reservoir fluid into a flow line within the downhole tool. In yet another implementation, the probe may include multiple inlets that may be used for focused sampling. In such implementations, the probe may be connected to a sampling flow line, as well as to guard flow lines. The probe 434 may be movable between extended and retracted positions for selectively engaging a wall 403 of the wellbore 404 and acquiring fluid samples from a formation F. One or more setting pistons 438 may be provided to assist in positioning the fluid communication module 430 against the wellbore wall.

In another implementation, FIG. 5 illustrates a wireline downhole tool 500 in accordance with implementations of various technologies and techniques described herein. The downhole tool 500 may be suspended in a wellbore 502 from the lower end of a multi-conductor cable 504 that is spooled on a winch at the surface. The cable 504 may be communicatively coupled to an electronics and processing system 506. The downhole tool 500 may include an elongated body 508 that houses modules 510, 512, 514, 522, and 524. The modules 510, 512, 514, 522, and 524 may provide various functionalities, including, but not limited to, fluid sampling, pressure transient testing, fluid testing, operational control, communication, and/or the like. The modules 510 and 512 may provide additional functionality, for example resistivity measurements, operational control, communications, coring, imaging, fluid analysis, and/or the like.

As shown in FIG. 5, the module 514 may be a communication module and/or fluid analysis module 514 that has a selectively extendable probe 516 and backup pistons 518 that are arranged on opposite sides of the elongated body 508. The extendable probe 516 may be configured to selectively seal off or isolate selected portions of the wall 503 of the wellbore 502 to fluidly couple to the adjacent formation 520 and/or to draw fluid samples from the formation 520. The probe 516 may include a single inlet or multiple inlets designed for guarded or focused sampling. The reservoir fluid may be expelled to the wellbore through a port in the body 508, or the reservoir fluid may be sent to one or more fluid sampling modules 522 and 524. The fluid sampling modules 522 and 524 may include sample chambers that store the reservoir fluid. In addition, the electronics and processing system 506 and/or a downhole control system may be configured to control the extendable probe assembly 516 and/or the drawing of a fluid sample from the formation 520.

In yet another implementation, fluid from the reservoir of interest may be passed by means of a primary flow line (not shown) to the fluid analyzer module 514 for analysis. The fluid analyzer module 514 may be employed to provide DFA measurements. For example, the fluid analyzer module 514 may include an optical spectrometer and/or a gas analyzer designed to measure properties such as, optical density, fluid fluorescence, fluid composition, the GOR, and/or the like. In particular, the spectrometer may employ one or more optical filters to identify the color (i.e., the optical density) of the reservoir fluid. Such color measurements may be used for fluid identification, determination of asphaltene content, and/or pH measurement. The reservoir fluids may exhibit different colors because they have varying amounts of aromatics, resins, and asphaltenes, each of which absorb light in the visible and near-infrared ("NIR") spectra. Heavy oils may have higher concentrations of aromatics, resins, and asphaltenes, which give them dark colors. Light oils and condensate, on the other hand, may have lighter, yellowish or bluish colors because they have lower concentrations of aromatics, resins, and asphaltenes.

One or more additional measurement devices, such as temperature sensors, pressure sensors, viscosity sensors, density sensors, resistivity sensors, chemical sensors (e.g., for measuring pH or $H_2S$ levels), and gas chromatographs may also be included within the fluid analyzer module 514. In one implementation, the fluid analyzer module 514 may measure absorption spectra and translate such measurements into concentrations of several alkane components and groups in the fluid sample. For example, the fluid analyzer module 514 may determine the concentrations (e.g., weight percentages) of carbon dioxide ($CO_2$), methane ($CH_4$), ethane ($C_2H_6$), the $C_3$-$C_5$ alkane group, and the lump of hexane and heavier alkane components ($C_{6+}$).

The fluid analysis module 514 may also include a controller (not shown), such as a microprocessor or control circuitry, designed to calculate certain fluid properties based on the sensor measurements. For example, the controller may calculate the GOR. Further, the controller may govern sampling operations based on the fluid measurements or properties. Moreover, the controller may be disposed within another module of the downhole tool 500.

The downhole tools described above with respect to FIGS. 4 and 5 may also be referred to as formation testers. Besides the implementations disclosed in FIGS. 4 and 5, other implementations of well site systems employing DFA systems and techniques known to those skilled in the art may be used. One example of a downhole tool which may be used to employ such systems and techniques may include the Modular Formation Dynamics Tester (MDT®), which is a registered trademark of Schlumberger Technology Corporation. Further, examples of a fluid communication module and/or fluid analysis module may include the Composition Fluid Analyzer (CFA®), Live Fluid Analyzer (LFA®), or the In Situ Fluid Analyzer (IFA®), which are registered trademarks of Schlumberger Technology Corporation.

In one implementation, a computing system associated with the fluid communication module and/or fluid analysis module as described above, such as the controller, may be used to determine the properties of the reservoir fluid (e.g., optical color and density and thereby asphaltene content, GOR, etc.) in substantially real time. In another implementation, the computing system associated with the fluid communication module and/or fluid analysis module may operate in conjunction with a surface computing system, such as the electronics and processing system 506 described above.

Further, other well logging instruments may be used in conjunction with the downhole tools described above, including those used to measure electrical resistivity, compressional and shear acoustic velocity, naturally occurring gamma radiation, gamma-gamma Compton scatter formation density, formation neutron hydrogen index (related to the fluid filled fractional volume of pore space of the rock formations), and/or nuclear magnetic resonance transverse and longitudinal relaxation time distribution and diffusion constant. In such an implementation, the well logging instruments, such as those that measure gamma radiation, may assist in identifying potential areas of interest in the subterranean formation. In particular, measurement stations may be assigned to these potential areas for the withdrawal of reservoir fluid samples.

Various implementations described herein are directed to a method for assessing risks of compartmentalization. In one implementation, the method may include receiving seismic data for a formation of interest; identifying areas in the formation having a dip angle greater than about 30 degrees; performing a plurality of downhole fluid analysis (DFA) within a wellbore around the formation having the dip angle greater than about 30 degrees to identify areas experiencing mass density inversion; and determining the areas experiencing mass density inversion by DFA as having one or more risks of compartmentalization.

The method may further include modifying a drilling plan based on the risks. In one implementation, modifying the drilling plan includes modifying a DFA program to identify well and formation locations that have normal mass density distributions near the base of the oil column in the wellbore.

In one implementation, determining the areas experiencing mass density inversion by DFA as having one or more risks of compartmentalization includes: receiving first DFA data from a first location at the wellbore around the formation; receiving second DFA data from a second location at the wellbore around the formation, wherein the second location is different from the first location; predicting DFA data at the second location using the first DFA data; comparing the predicted DFA data with the second DFA data; and if the predicted DFA data differs from the second DFA data by a predetermined value, then determining that the area are experiencing non-equilibrium.

In one implementation, the DFA data are predicted by analyzing the first DFA to determine whether a fluid column is equilibrated using one or more equations of sate models of thermodynamic behavior of reservoir fluid. The areas experiencing mass density inversion may be indicated by heavier oil near the top of a downhole fluid column, by increase in dissolved gas near the bottom of a downhole fluid column, greater concentration of asphaltene near the top of a downhole fluid column, lighter color fluids near the bottom of a downhole fluid column or darker color fluids near the top of the downhole fluid column.

In another implementation, the method may further include identifying geological features associated with compartmentalization from the seismic data, wherein the geological features are selected from the group consisting of one or more salt keels, sealing barriers, faults, fractures, dip angles and rollovers.

In another implementation, the method may further include modifying a drilling plan such that the wellbore intercepts more of one or more geological features associated with compartmentalization.

In another implementation, the risks of compartmentalization include the existence of sealing barriers in the formation of interest.

In another implementation, the method may further include determining a flow assurance, a production strategy or a field development planning of the formation of interest based on the risks of compartmentalization. Likewise, performing the plurality of downhole fluid analysis may include analyzing DFA data for fluid markers associated with mass density inversion.

Various techniques described herein are directed to an information processing apparatus for use in a computing system is provided, and includes various means for receiving seismic data for a formation of interest; identifying areas in the formation having a dip angle greater than about 30 degrees; performing a plurality of downhole fluid analysis (DFA) within a wellbore around the formation having the dip angle greater than about 30 degrees to identify areas experiencing mass density inversion; and determining the areas experiencing mass density inversion by DFA as having one or more risks of compartmentalization.

In some implementations, a computing system is provided that includes at least one processor, at least one memory, and one or more programs stored in the at least one memory, wherein the programs may include instructions, which when executed by the at least one processor cause the computing system to receive seismic data for a formation of interest; identify areas in the formation having a dip angle greater than about 30 degrees; perform a plurality of downhole fluid analysis (DFA) within a wellbore around the formation having the dip angle greater than about 30 degrees to identify areas experiencing mass density inversion; and determine the areas experiencing mass density inversion by DFA as having one or more risks of compartmentalization.

Various implementations described herein are directed to a non-transitory computer readable medium having stored thereon a plurality of computer-executable instructions which, when executed by a computer, cause the computer to: receive seismic data for a formation of interest; identify areas in the formation having a dip angle greater than about 30 degrees; perform a plurality of downhole fluid analysis (DFA) within a wellbore around the formation having the dip angle greater than about 30 degrees to identify areas experiencing mass density inversion; and determine the areas experiencing mass density inversion by DFA as having one or more risks of compartmentalization.

Various implementations described herein are directed to a method for assessing risks of compartmentalization, comprising: receiving seismic data for a formation of interest; identifying areas in the formation having a dip angle greater than about 30 degrees; performing a plurality of downhole fluid analysis (DFA) within a wellbore around the formation having the dip angle greater than about 30 degrees to identify areas experiencing mass density inversion; determining the areas experiencing mass density inversion by DFA as likely having one or more sealing barriers; and modifying a DFA program to identify well and formation locations that have normal mass density distributions near the base of the oil column in the wellbore.

Computing Systems

Implementations of various technologies described herein may be operational with numerous general purpose or special purpose computing system environments or configurations. Examples of well-known computing systems, environments, or configurations that may be suitable for use with the various technologies described herein include, but are not limited to, personal computers, server computers, handheld or laptop devices, multiprocessor systems, microprocessor-based systems, set top boxes, programmable consumer electronics, network PCs, minicomputers, mainframe computers, smart phones, smart watches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. The distributed computing environments may span multiple continents and multiple vessels, ships or boats. In a distributed computing environment, program modules may be located in both local and remote computer storage media including memory storage devices.

Figure 6:
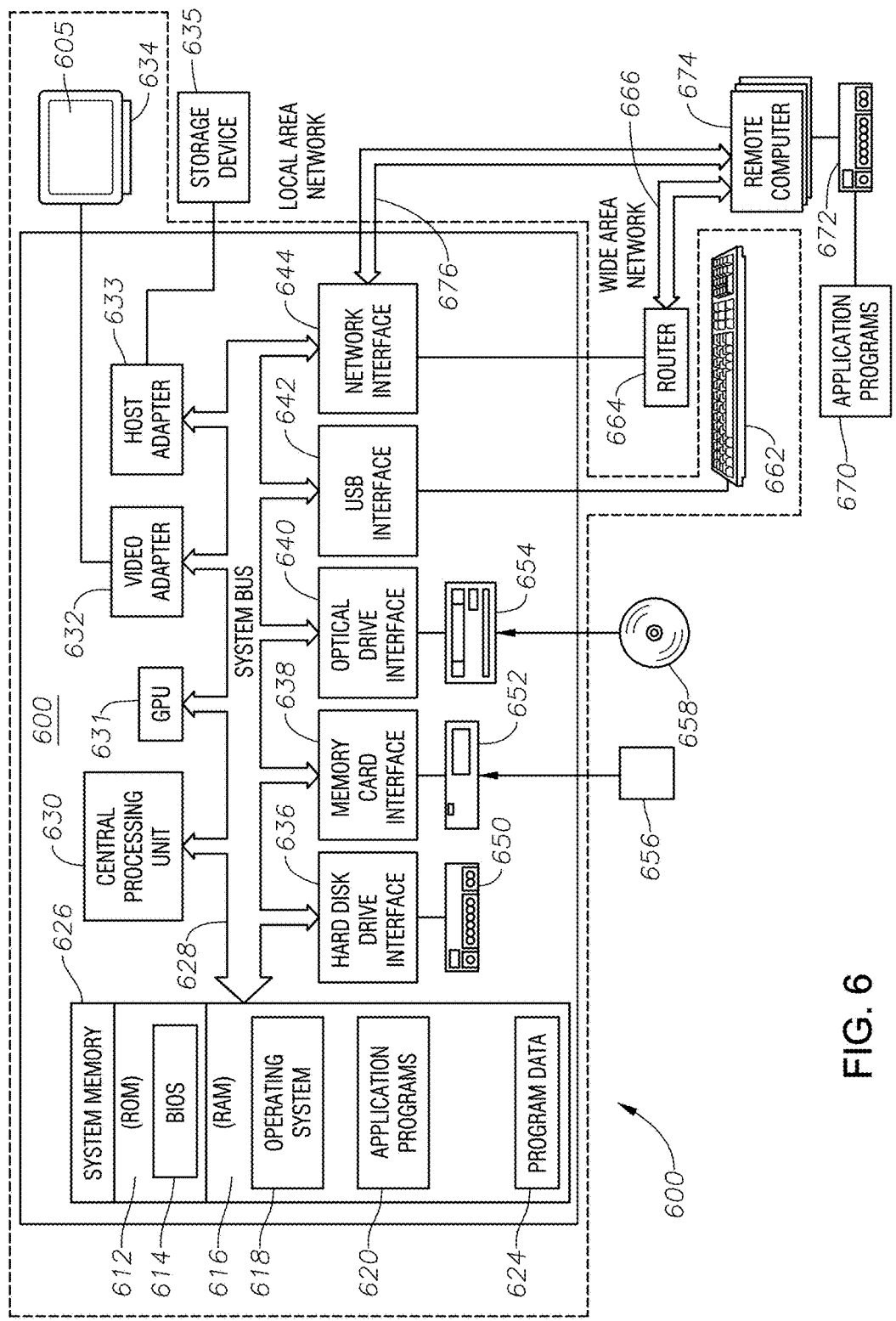
FIG. 6 illustrates a computing system in which various implementations of various techniques described herein may be implemented.

FIG. 6 illustrates a schematic diagram of a computing system 600 in which the various technologies described herein may be incorporated and practiced. Although the computing system 600 may be a conventional desktop or a server computer, as described above, other computer system configurations may be used.

The computing system 600 may include a central processing unit (CPU) 630, a system memory 626, a graphics processing unit (GPU) 631 and a system bus 628 that couples various system components including the system memory 626 to the CPU 630. Although one CPU is illustrated in FIG. 6, it should be understood that in some implementations the computing system 600 may include more than one CPU. The GPU 631 may be a microprocessor specifically designed to manipulate and implement computer graphics. The CPU 630 may offload work to the GPU 631. The GPU 631 may have its own graphics memory, or may have access to a portion of the system memory 626. As with the CPU 630, the GPU 631 may include one or more processing units, and the processing units may include one or more cores. The system bus 628 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 626 may include a read-only memory (ROM) 612 and a random access memory (RAM) 646. A basic input/output system (BIOS) 614, containing the basic routines that help transfer information between elements within the computing system 1300, such as during start-up, may be stored in the ROM 612.

The computing system 600 may further include a hard disk drive 650 for reading from and writing to a hard disk, a magnetic disk drive 652 for reading from and writing to a removable magnetic disk 656, and an optical disk drive 654 for reading from and writing to a removable optical disk 658, such as a CD ROM or other optical media. The hard disk drive 650, the magnetic disk drive 652, and the optical disk drive 654 may be connected to the system bus 628 by a hard disk drive interface 656, a magnetic disk drive interface 658, and an optical drive interface 650, respectively. The drives and their associated computer-readable media may provide nonvolatile storage of computer-readable instructions, data structures, program modules and other data for the computing system 600.

Although the computing system 600 is described herein as having a hard disk, a removable magnetic disk 656 and a removable optical disk 658, it should be appreciated by those skilled in the art that the computing system 600 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 600. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 600 may also include a host adapter 633 that connects to a storage device 635 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 650, magnetic disk 656, optical disk 658, ROM 612 or RAM 616, including an operating system 618, one or more application programs 620, program data 624, and a database system 648. The application programs 620 may include various mobile applications ("apps") and other applications configured to perform various methods and techniques described herein. The operating system 618 may be any suitable operating system that may control the operation of a networked personal or server computer, such as Windows® XP, Mac OS® X, Unix-variants (e.g., Linux® and BSD®), and the like.

A user may enter commands and information into the computing system 600 through input devices such as a keyboard 662 and pointing device 660. Other input devices may include a microphone, joystick, game pad, satellite dish, scanner, or the like. These and other input devices may be connected to the CPU 630 through a serial port interface 642 coupled to system bus 628, but may be connected by other interfaces, such as a parallel port, game port or a universal serial bus (USB). A monitor 634 or other type of display device may also be connected to system bus 628 via an interface, such as a video adapter 632. In addition to the monitor 634, the computing system 600 may further include other peripheral output devices such as speakers and printers.

Further, the computing system 600 may operate in a networked environment using logical connections to one or more remote computers 674. The logical connections may be any connection that is commonplace in offices, enterprise-wide computer networks, intranets, and the Internet, such as local area network (LAN) 656 and a wide area network (WAN) 666. The remote computers 674 may be another a computer, a server computer, a router, a network PC, a peer device or other common network node, and may include many of the elements describes above relative to the computing system 600. The remote computers 674 may also each include application programs 670 similar to that of the computer action function.

When using a LAN networking environment, the computing system 600 may be connected to the local network 676 through a network interface or adapter 644. When used in a WAN networking environment, the computing system 600 may include a router 664, wireless router or other means for establishing communication over a wide area network 666, such as the Internet. The router 664, which may be internal or external, may be connected to the system bus 628 via the serial port interface 652. In a networked environment, program modules depicted relative to the computing system 600, or portions thereof, may be stored in a remote memory storage device 672. It will be appreciated that the network connections shown are merely examples and other means of establishing a communications link between the computers may be used.

The network interface 644 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 674.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, on the user's computing device, as a stand-alone software package, on the user's computer and on a remote computer or entirely on the remote computer or a server computer.

The system computer 600 may be located at a data center remote from the survey region. The system computer 600 may be in communication with the receivers (either directly or via a recording unit, not shown), to receive signals indicative of the reflected seismic energy. These signals, after conventional formatting, and other initial processing, may be stored by the system computer 600 as digital data in the disk storage for subsequent retrieval and processing in the manner described above. In one implementation, these signals and data may be sent to the system computer 600 directly from sensors, such as geophones, hydrophones and the like. When receiving data directly from the sensors, the system computer 600 may be described as part of an in-field data processing system. In another implementation, the system computer 600 may process seismic data already stored in the disk storage. When processing data stored in the disk storage, the system computer 600 may be described as part of a remote data processing center, separate from data acquisition. The system computer 600 may be configured to process data as part of the in-field data processing system, the remote data processing system or a combination thereof.

Those with skill in the art will appreciate that any of the listed architectures, features or standards discussed above with respect to the example computing system 1300 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

While the foregoing is directed to implementations of various technologies described herein, other and further implementations may be devised without departing from the basic scope thereof. Although the subject matter has been described in language specific to structural features or methodological acts, it is to be understood that the subject matter defined in the appended claims is not limited to the specific features or acts described above. Rather, the specific features and acts described above are disclosed as example forms of implementing the claims.

What is claimed is:

1. A method for assessing risks of compartmentalization, comprising:
   receiving seismic data for a formation of interest;
   identifying areas in the formation having a dip angle greater than about 30 degrees;
   receiving fluid sample data related to a plurality of fluid samples that were captured by a downhole tool within a wellbore around the formation having the dip angle greater than about 30 degrees;
   performing a plurality of downhole fluid analyses (DFA) on the fluid sample data to identify areas experiencing mass density inversion; and
   determining the areas experiencing mass density inversion by DFA as having one or more risks of compartmentalization.

2. The method of claim 1, further comprising modifying a drilling plan based on the risks.

3. The method of claim 2, wherein modifying the drilling plan comprises modifying a DFA program to identify well and formation locations that have normal mass density distributions near the base of the oil column in the well bore.

4. The method of claim 1, wherein determining the areas experiencing mass density inversion by DFA as having one or more risks of compartmentalization comprises:
   receiving first DFA data from a first location at the wellbore around the formation;
   receiving second DFA data from a second location at the wellbore around the formation, wherein the second location is different from the first location;
   predicting DFA data at the second location using the first DFA data;
   comparing the predicted DFA data with the second DFA data; and
   if the predicted DFA data differs from the second DFA data by a predetermined value, then determining that the area are experiencing non-equilibrium.

5. The method of claim 1, wherein the DFA data are predicted by analyzing the first DFA to determine whether a fluid column is equilibrated using one or more equations of sate models of thermodynamic behavior of reservoir fluid.

6. The method of claim 1, wherein the areas experiencing mass density inversion are indicated by heavier oil near the top of a downhole fluid column.

7. The method of claim 1, wherein the areas experiencing mass density inversion are indicated by increase in dissolved gas near the bottom of a downhole fluid column.

8. The method of claim 1, wherein the areas experiencing mass density inversion are indicated by greater concentration of asphaltene near the top of a downhole fluid column.

9. The method of claim 1, wherein the areas experiencing mass density inversion are indicated by lighter color fluids near the bottom of a downhole fluid column or darker color fluids near the top of the downhole fluid column.

10. The method of claim 1, further comprising identifying geological features associated with the compartmentalization, wherein the geological features are selected from the group consisting of one or more salt keels, sealing barriers, faults, fractures, dip angles and rollovers.

11. The method of claim 10, further comprising causing a trajectory of the wellbore to vary such that the wellbore intercepts one or more of the geological features associated with the compartmentalization.

12. The method of claim 1, wherein the risks of compartmentalization comprise the existence of sealing barriers in the formation of interest.

13. The method of claim 1, further comprising determining a flow assurance, a production strategy or a field development planning of the formation of interest based on the risks of compartmentalization.

14. The method of claim 1, wherein performing the plurality of downhole fluid analysis comprises analyzing DFA data for fluid markers associated with mass density inversion.

15. The method of claim 1, wherein the downhole tool comprises a probe configured to extend into contact with a wall of the wellbore to capture the fluid samples from the formation.

16. A non-transitory computer readable medium having stored thereon a plurality of computer-executable instructions which, when executed by a computer, cause the computer to:
   receive seismic data for a formation of interest;
   identify areas in the formation having a dip angle greater than about 30 degrees;
   perform a plurality of downhole fluid analysis (DFA) within a wellbore around the formation having the dip angle greater than about 30 degrees to identify areas experiencing mass density inversion; and
   determine the areas experiencing mass density inversion by DFA as having one or more risks of compartmentalization.

17. The non-transitory computer readable medium of claim 16, further comprising instructions that cause the computer to modify a drilling plan based on the risks.

18. The non-transitory computer readable medium of claim 17, wherein the computer-executable instructions that cause the computer to modify the drilling plan comprises computer-executable instructions that cause the computer to modify a DFA program to identify well and formation locations that have normal mass density distributions near the base of the oil column in the well bore.

19. The non-transitory computer readable medium of claim 16, wherein the computer-executable instructions that cause the computer to determine the areas experiencing mass density inversion by DFA as having one or more risks of compartmentalization comprises computer-executable instructions that cause the computer to:
   receive first DFA data from a first location at the wellbore around the formation;
   receive second DFA data from a second location at the wellbore around the formation, wherein the second location is different from the first location;
   predict DFA data at the second location using the first DFA data;
   compare the predicted DFA data with the second DFA data; and
   if the predicted DFA data differs from the second DFA data by a predetermined value, then determine that the area are experiencing non-equilibrium.

20. A method for assessing risks of compartmentalization, comprising:
   receiving seismic data for a formation of interest;
   identifying areas in the formation having a dip angle greater than about 30 degrees;

receiving fluid sample data related to a plurality of fluid samples that were captured by a downhole tool within a wellbore around the formation having the dip angle greater than about 30 degrees;

performing a plurality of downhole fluid analyses (DFA) on the fluid sample data to identify areas experiencing mass density inversion;

determining the areas experiencing mass density inversion by DFA as likely having one or more sealing barriers; and modifying a DFA program to identify well and formation locations that have normal mass density distributions near the base of the oil column in the well bore.

\* \* \* \* \*